United States Patent
Yoshioka et al.

(10) Patent No.: US 9,100,529 B2
(45) Date of Patent: Aug. 4, 2015

(54) POWER SUPPLY UNIT AND IMAGE FORMING APPARATUS

(71) Applicants: Yu Yoshioka, Kanagawa (JP); Tetsuya Yano, Kanagawa (JP)

(72) Inventors: Yu Yoshioka, Kanagawa (JP); Tetsuya Yano, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 285 days.

(21) Appl. No.: 13/728,155

(22) Filed: Dec. 27, 2012

(65) Prior Publication Data
US 2013/0169990 A1 Jul. 4, 2013

(30) Foreign Application Priority Data

Dec. 29, 2011 (JP) ................................. 2011-290433
Dec. 12, 2012 (JP) ................................. 2012-271746

(51) Int. Cl.
| | |
|---|---|
| H04N 1/00 | (2006.01) |
| H02J 9/06 | (2006.01) |
| H02J 1/00 | (2006.01) |
| G03G 15/00 | (2006.01) |

(52) U.S. Cl.
CPC ........... *H04N 1/00899* (2013.01); *G03G 15/80* (2013.01); *H02J 1/00* (2013.01); *H02J 9/061* (2013.01); *H04N 1/00901* (2013.01); *G03G 2215/0132* (2013.01); *H04N 2201/0082* (2013.01); *H04N 2201/0091* (2013.01); *H04N 2201/0093* (2013.01); *H04N 2201/0094* (2013.01)

(58) Field of Classification Search
CPC .. H04N 1/00899; H04N 1/00901; H02J 9/061
USPC .................. 713/320, 323; 320/166; 358/1.14; 714/14
See application file for complete search history.

(56) References Cited

U.S. PATENT DOCUMENTS 5,394,028 A * 2/1995 Feddeler et al. ............... 327/544
6,157,168 A * 12/2000 Malik ............................ 320/128
(Continued)

FOREIGN PATENT DOCUMENTS

| CN | 1716728 A | 1/2006 |
|---|---|---|
| CN | 200990515 Y | 12/2007 |

(Continued)

OTHER PUBLICATIONS

Chinese Office Action issued Aug. 5, 2014, in China Patent Application No. 201210579198.4.

*Primary Examiner* — Stefan Stoynov
(74) *Attorney, Agent, or Firm* — Oblon, McClelland, Maier & Neustadt, L.L.P.

(57) ABSTRACT

A power supply unit includes a first power supply configured to supply electric power to a load using electric power supplied from an external power source; a second power supply configured to store the electric power supplied from the external power source and supply the stored electric power to the load; a no-power detecting unit configured to monitor a voltage of the external power source and detect no electric power from the external power source; and an output switching unit configured to switch the electric power to be supplied to the load to the electric power supplied from the second power supply when the no-power detecting unit detects no electric power. A first setting value that is a target output voltage of the first power supply is larger than a second setting value that is a target output voltage of the second power supply.

6 Claims, 7 Drawing Sheets

(56) References Cited

U.S. PATENT DOCUMENTS

| | | |
|---|---|---|
| 8,023,126 B2 | 9/2011 | Semma et al. |
| 8,484,491 B2 * | 7/2013 | Kageyama et al. ........... 713/300 |
| 2005/0286925 A1 | 12/2005 | Yoshida |
| 2006/0055386 A1 * | 3/2006 | Osaka ........................... 323/282 |
| 2007/0071479 A1 | 3/2007 | Semma et al. |
| 2007/0098433 A1 | 5/2007 | Yano et al. |
| 2007/0200432 A1 | 8/2007 | Yano et al. |
| 2007/0201894 A1 | 8/2007 | Kishi et al. |
| 2007/0212102 A1 | 9/2007 | Yano |
| 2007/0286631 A1 | 12/2007 | Koya |
| 2011/0194871 A1 | 8/2011 | Matsumoto |
| 2013/0076142 A1 * | 3/2013 | Johnson, Jr. .................... 307/66 |

FOREIGN PATENT DOCUMENTS

| | | |
|---|---|---|
| CN | 101621214 A | 1/2010 |
| CN | 102148570 A | 8/2011 |
| JP | 2005-148581 | 6/2005 |
| JP | 2007-336795 | 12/2007 |

* cited by examiner

POWER SUPPLY UNIT AND IMAGE FORMING APPARATUS

CROSS-REFERENCE TO RELATED APPLICATIONS

The present application claims priority to and incorporates by reference the entire contents of Japanese Patent Application No. 2011-290433 filed in Japan on Dec. 29, 2011 and Japanese Patent Application No. 2012-271746 filed in Japan on Dec. 12, 2012.

BACKGROUND OF THE INVENTION

1. Field of the Invention

The present invention relates to a power supply unit and an image forming apparatus including the power supply unit.

2. Description of the Related Art

An image forming apparatus using an electrophotography process, such as copying machine, a printer, a facsimile machine, or a multifunction machine including these functions, includes a photosensitive element which is an image carrier, an image forming unit that includes a charging unit, an exposing unit, a developing unit, a transferring unit, and the like arranged around the photosensitive element, and a fixing unit (also referred to as a "fixing device") for fixing a toner image transferred to a transfer sheet by the transferring unit. A fixing roller including a heater (fixing heater) is provided in the fixing unit, and a heater control device that controls supply of electric power to the fixing heater is also provided in order to maintain a surface temperature (fixing temperature) of the fixing roller to a target temperature.

In recent years, with multi-function of such an image forming apparatus, the structure thereof has also become complex and maximum power consumption tends to increase.

Further, the amount of power supplied (fed) to a fixing heater tends to increase in order to decrease a standby period of an operator and factors associated with an image forming apparatus itself such as a standby period before a fixing unit starts or a temporary halt of an operation due to a decrease in a fixing temperature during printing or copying.

On the other hand, since there is an upper limit power that can be supplied from a commercial power supply, when only a first power supply (main power supply) that supplies power from the commercial power supply is used, power consumption may exceed the maximum power consumption. Thus, an image forming apparatus that uses a second power supply (auxiliary power supply) that includes an electric storage device and a power supply circuit that uses electric power of the electric storage device as a power source and supplies electric power to a system by switching the first and second power supplies is already known.

However, in such an image forming apparatus, there is a possibility that an abnormality occurs in the output from the first power supply due to an overvoltage or an overcurrent, a voltage variation, and the like during a recovery (power failure recovery) from a power-cut state due to a power failure. In this case, there is a problem in that switching from the output (power supply) of the second power supply to the output of the first power supply is not properly performed, and a normal recovery is not realized.

Thus, for example, Japanese Patent Application Laid-open No. 2005-148581 discloses a technique in which in order to prevent deterioration of an image forming unit when a power failure occurs during printing, charged electric power of an auxiliary power supply (second power supply) used as a power supplying unit for supplying electric power to a fixing heater is supplied to an image forming unit to continue an image forming process during a power failure so that respective units are not damaged even when the supply of electric power from a main power supply is cut.

However, according to the disclosure of Japanese Patent Application Laid-open No. 2005-148581, the configuration of the second power supply is not clear, and a voltage variation when switching of the output of the power supply occurs during startup or operations of the system is not taken into consideration. Thus, it is difficult to solve the problem that when an abnormality occurs in the output of the first power supply during a power failure recovery, switching from the output of the second power supply to the output of the first power supply is not properly performed, and a recovery is not properly realized.

Therefore, there is a need to allow a recovery to be realized properly without causing an abnormality in the output of a power supply even when a power failure occurs.

SUMMARY OF THE INVENTION

It is an object of the present invention to at least partially solve the problems in the conventional technology.

According to an embodiment, there is provided a power supply unit that includes a first power supply configured to supply electric power to a load using electric power supplied from an external power source; a second power supply including an electric storage unit configured to store the electric power supplied from the external power source, the second power supply being configured to supply the electric power stored in the electric storage unit to the load; a no-power detecting unit configured to monitor a voltage of the external power source and detect that no electric power is supplied from the external power source; and an output switching unit configured to switch the electric power to be supplied to the load to the electric power supplied from the second power supply when the no-power detecting unit detects that no electric power is supplied from the external power source. A first setting value that is a target output voltage of the first power supply is larger than a second setting value that is a target output voltage of the second power supply.

According to another embodiment, there is provided an image forming apparatus that includes the power supply unit according to the above embodiment, wherein the image forming apparatus performs image formation using the electric power supplied from the power supply unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described. A power supply unit of the following embodiment includes a first power supply (main power supply) that performs a constant-voltage output operation and supplies electric power to a load using electric power supplied from an external power source and a second power supply (auxiliary power supply) that includes an electric storage device and a power supply circuit that uses electric power of the electric storage device as a power source. Moreover, electric power is supplied from the second power supply to the load, and when electric power is supplied from the outside, the second power supply is caused to output a constant current to thereby suppress a voltage variation. Further, when supply of power from the outside is cut (during a power failure), the second power supply is switched to a constant-voltage output operation.

The power supply unit of this embodiment sets voltages so that an output setting voltage of the first power supply is lower than an output setting voltage of the second power supply. Therefore, since the first power supply outputs its power immediately after a power failure recovery is detected, a circuit abnormality such as a voltage variation is eliminated when the output voltage of the second power supply is switched to the output voltage of the first power supply. Further, the circuit is not complicated since it is necessary to set the output voltage only.

Hereinafter, the embodiments will be described in detail with reference to FIGS. 1 to 8.

Figure 1:
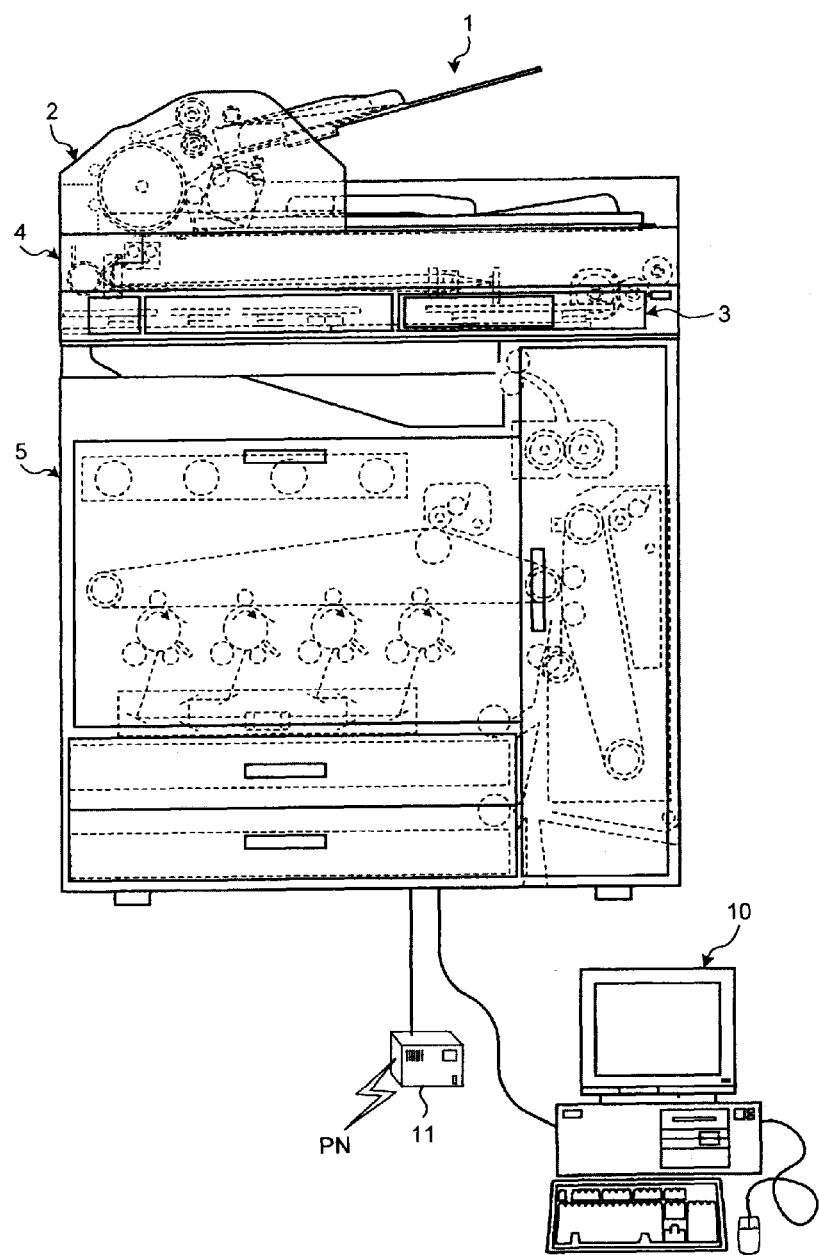
FIG. 1 is an exemplary diagram illustrating a schematic configuration example of a full-color digital copying machine which is an image forming apparatus that includes a power supply unit according to an embodiment.

FIG. 1 is an exemplary diagram illustrating a schematic configuration example of a full-color digital copying machine which is an image forming apparatus that includes a power supply unit according to the embodiment.

This full-color digital copying machine (hereinafter referred to simply as an "apparatus") 1 includes respective units of an automatic document feeder (ADF) 2, an operation board 3, a color scanner 4, a color printer 5, and the like.

The operation board 3 and the color scanner 4 with the ADF 2 are units that can be separated from the color printer 5. Moreover, the color scanner 4 includes a control board that includes a power device driver, a sensor input terminal, and a controller. The color scanner 4 communicates directly or indirectly with a CPU of an engine control unit (engine controller) (not illustrated) to perform timing control and reads the image of a document.

A controller board to which the color scanner 4, the color printer 5, and the engine controller are connected is connected to a network such as an intra-office local area network (LAN) to which a personal computer (PC) 10 is connected. Further, a facsimile control unit (FCU) (not illustrated) is connected to an exchange 11 that is connected to a telephone line PN (facsimile communication line).

Figure 2:
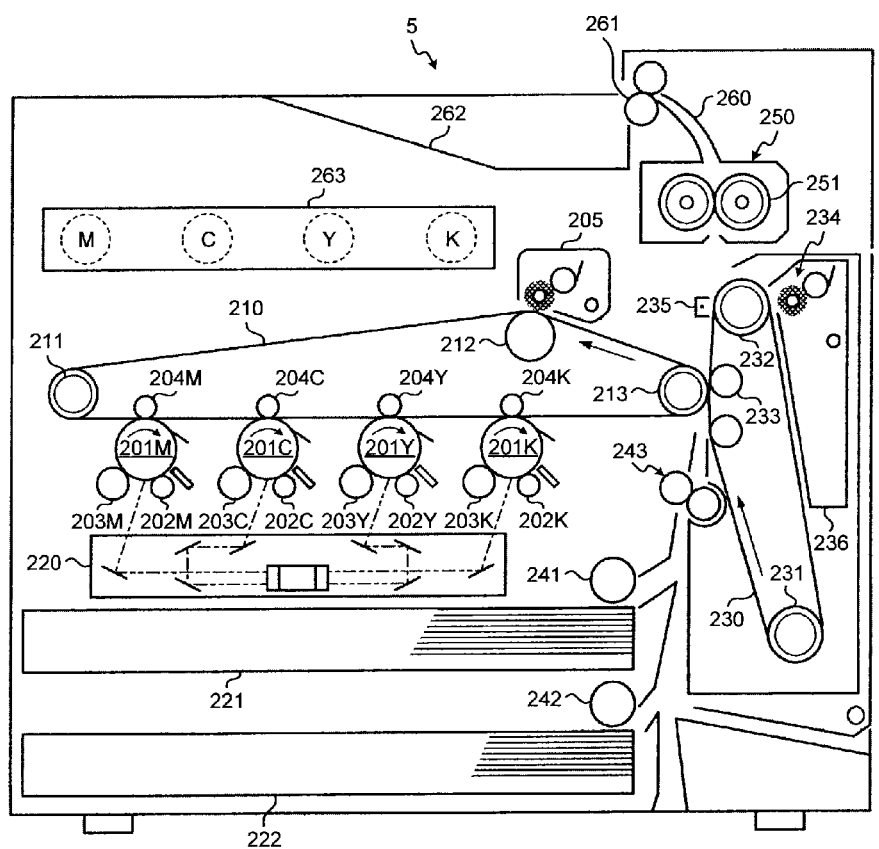
FIG. 2 illustrates a configuration example of a color printer 5 illustrated in FIG. 1.

FIG. 2 illustrates a configuration example of the color printer 5 illustrated in FIG. 1.

In this example, a laser printer is used as the color printer 5. The color printer 5 has a configuration in which four toner image forming units for forming images of the respective colors of magenta (M), cyan (C), yellow (Y), and black (K) are arranged in that order along a moving direction (left to right in FIG. 2) of a first transfer belt 210. Thus, this color printer 5 forms a four-drum (tandem) full-color image forming apparatus.

For example, a roller charging device 202M which is a charging unit, a developing device 203M which is a developing unit, and the like are arranged around the outer circumference of a magenta photosensitive element 201M that is rotatably supported and rotates in the direction indicated by the arrow.

A space through which a laser beam emitted from an exposing device 220 passes is secured between the roller charging device 202M and the developing device 203M.

Four photosensitive elements 201 (201M, 201C, 201Y, and 201K) are provided, and image forming components provided around each photosensitive element have the same configuration. Only the colors of colorants (toner) handled by the developing device 203 are different. A portion of each of the four photosensitive elements 201 is in contact with the first transfer belt 210. Although the photosensitive element 201 is configured as a cylindrical photosensitive drum, a belt-shaped photosensitive element may also be used.

The first transfer belt 210 is configured to be movable in the direction indicated by the arrow and be supported and stretched between rotating support rollers 211 and 212 and a driving roller 213. On the inner side (the inner side of the loop) of the first transfer belt 210, first transfer rollers 204 (204M, 204C, 204Y, and 204K) which are first transfer unit are disposed near the corresponding photosensitive elements 201. A cleaning device 205 for the first transfer belt 210 is disposed on the outer side of the belt loop. After a toner image is transferred to a sheet (a transfer sheet) or a second transfer belt 230 by the first transfer belt 210, the cleaning device 205 removes unnecessary toner that remains on the surface of the first transfer belt 210.

The exposing device 220 emits a laser beam corresponding to full-color image formation to the surface of each photosensitive element 201 that is evenly charged to thereby form a latent image according to a well-known laser scanning method. The exposing device 220 needs not to be limited to the laser method, and an exposing device or the like that includes LED arrays and a focusing unit for focusing light beams from the LED arrays may also be employed.

A second transfer belt 230 is disposed on the right side of the first transfer belt 210 in FIG. 2. The first and second transfer belts 210 and 230 make contact with each other to form a predetermined transfer nip. The second transfer belt 230 is configured to be movable in the direction indicated by the arrow and be supported and stretched between a support roller 232 and a driving roller 231. A second transfer roller 233 which is a second transfer unit is disposed on the inner side of the belt loop. A cleaning device 234 for the second transfer belt 230, a charger 235, and the like are disposed on the outer side of the belt loop.

The cleaning device 234 removes unnecessary toner that remains on the second transfer belt 230 after a toner image is transferred to a sheet.

Sheets are stored in paper cassettes 221 and 222 on the lower side of FIG. 2. An uppermost sheet is conveyed one by one by a paper feeding roller 241 or 242 to a registration roller pair 243 which is a positioning roller pair through a plurality of sheet guides.

Further, a fixing unit 250, a discharging guide 260, discharging rollers 261, and a discharging stack 262 are disposed above the second transfer belt 230. Furthermore, a storage unit 263 configured to store toner for replenishment is provided above the first transfer belt 210 and below the discharging stack 262. The toner has four colors of magenta (M), cyan (C), yellow (Y), and black (K). The toner is stored in a cartridge form and is appropriately supplied to the developing device 203 of the corresponding color by a powder pump or the like (not illustrated).

Here, an operation of the color printer 5 when performing duplex printing will be described.

First, the photosensitive element 201 performs an image formation operation.

Specifically, when the exposing device 220 operates, a light beam corresponding to a magenta (M) color from a laser diode (LD) light source (not illustrated) passes through optical components to reach the photosensitive element 201M among the photosensitive elements 201 which are evenly charged by the roller charging device 202. As a result, a latent image corresponding to writing information (information corresponding to the color) is formed on the photosensitive element 201M.

The latent image on the photosensitive element 201M is developed by the developing device 203M, and a toner image which is an image made visible with toner is formed and held on the surface of the photosensitive element 201M. The first transfer roller 204M transfers this toner image to the surface of the first transfer belt 210 that moves in synchronization with the photosensitive element 201M.

The toner that remains on the surface of the photosensitive element 201M is cleaned by a cleaning device (not illustrated). The photosensitive element 201M is neutralized by a neutralization device so as to be prepared for the next image formation cycle.

The first transfer belt 210 carries the toner image transferred to the surface and moves in the direction indicated by the arrow.

A latent image corresponding to a cyan color which is a different color is formed on the photosensitive element 201C, and the latent image is made visible with toner of a cyan color to become a toner image. The toner image of the cyan color is superimposed on the toner image of the magenta color that is already formed on the first transfer belt 210. In this manner, the toner images of yellow and black colors are superimposed thereon, and finally, toner images of the four colors are superimposed.

There is a case where a toner image of a single black (K) color only is formed. In this case, the second transfer belt 230 is moved in the direction indicated by an arrow in synchronization with the first transfer belt 210. According to the operation of the second transfer roller 233, the toner image formed on the first transfer belt 210 is transferred to the surface of the second transfer belt 230.

Since image formation progresses when the first and second transfer belts 210 and 230 move in a state where the toner images are formed on the photosensitive elements 201M, 201C, 201Y, and 201K of the four tandem image forming units, it is possible to shorten an image formation period.

When the first transfer belt 210 moves to a predetermined position, a toner image that is to be formed on the other surface of the sheet is formed by the photosensitive elements 201M, 201C, 201Y, and 201K according to the same process as above, and sheet feeding is started. A sheet located on the uppermost side within the paper cassette 221 or 222 is drawn and conveyed to the registration roller pair 243. The second transfer roller 233 transfers the toner image on the surface of the first transfer belt 210 to a single side of the sheet which is passed through the registration roller pair 243 and conveyed to the position between the first and second transfer belts 210 and 230.

Further, the sheet is conveyed to the upper side, and the toner image on the surface of the second transfer belt 230 is transferred to the other side of the sheet by the charger 235. In this transferring, the sheet is transferred in a timed manner so that the image is at the correct position.

In this manner, the sheet in which the toner image is transferred to both sides thereof is conveyed to the fixing unit 250. The toner images (both sides) on the sheet are thermally fixed (fused and fixed) at a time by fixing rollers 251. The sheet to which the toner image is fixed is passed through the discharging guide 260 and is discharged to the discharging stack 262 above a body frame by the discharging rollers 261. Although a fixing heater is included in the fixing rollers 251, an electromagnetic induction heating layer may be included instead of the fixing heater. In this case, an IH coil unit which is an electromagnetic induction unit for heating the electromagnetic induction heating layer in the fixing rollers 251 is provided, and the fixing rollers 251 are heated by the electromagnetic induction of the IH coil unit.

When the discharging guide 260 to the discharging stack 262 are configured as illustrated in FIG. 2, the sheet is placed on the discharging stack 262 so that a surface (page) of the sheet to which an image of both-side images is transferred, that is, a surface of the sheet to which an image is directly transferred from the first transfer belt 210 becomes the lower surface. Thus, in order to align the pages, a toner image of the second pages is first formed, and the toner image is held on the second transfer belt 230, and a toner image of the first page is directly transferred to the sheet from the first transfer belt 210. The image transferred directly to the sheet from the first transfer belt 210 becomes a normal image on the surface of the photosensitive element. The toner image transferred to the sheet from the second transfer belt 230 is exposed so that the toner image becomes a reverse image (mirror image) on the surface of the photosensitive element.

An image formation order for realizing such a page alignment and an image process of switching normal and reverse (mirror) images are also performed by a controller (not illustrated) that controls reading and writing of image data from and to a memory.

After the toner image is transferred to the sheet from the second transfer belt 230, the cleaning device 234 that includes a brush roller, a recovery roller, a blade, and the like removes unnecessary toner and paper powder that remain on the second transfer belt 230.

In FIG. 2, the brush roller of the cleaning device 234 of the second transfer belt 230 is separated from the surface of the second transfer belt 230. The cleaning device 234 has such a structure that it can swing about a fulcrum and can make contact with and be separated from the surface of the second transfer belt 230. The cleaning device 234 is separated from the second transfer belt 230 when the second transfer belt 230 carries the toner image before the toner image is transferred to the sheet. The cleaning device 234 is swung counterclockwise in FIG. 2 to make contact with the second transfer belt 230 only when cleaning is necessary. The removed unnecessary toner is collected in a toner storage unit 236.

The above is an image forming process in a duplex printing mode in which a "duplex transfer mode" is set. In the case of duplex printing, printing is always performed in this image forming process.

In the case of single-sided printing, there are two modes: "single-sided transfer mode using the second transfer belt 230" and "single-sided transfer mode using the first transfer belt 210". When the former single-sided transfer mode that uses the second transfer belt 230 is set, a transfer operation is performed as follows. The toner image of three or four colors superimposed on the first transfer belt 210 or a toner image of the single black (K) color is transferred to the second transfer belt 230 and is then transferred to a single side of the sheet. No image is transferred to the other surface of the sheet. In this case, a printed image is presented on the upper surface of the printed sheet that is discharged to the discharging stack 262.

When the latter single-sided transfer mode that uses the first transfer belt 210 is set, the toner image of three or four colors superimposed on the first transfer belt 210 or a toner image of the single black (K) color is not transferred to the second transfer belt 230 but is transferred to a single side of the sheet. No image is transferred to the other surface of the sheet. In this case, a printed image is presented on the lower surface of the printed sheet that is discharged to the discharging stack 262.

Figure 3:
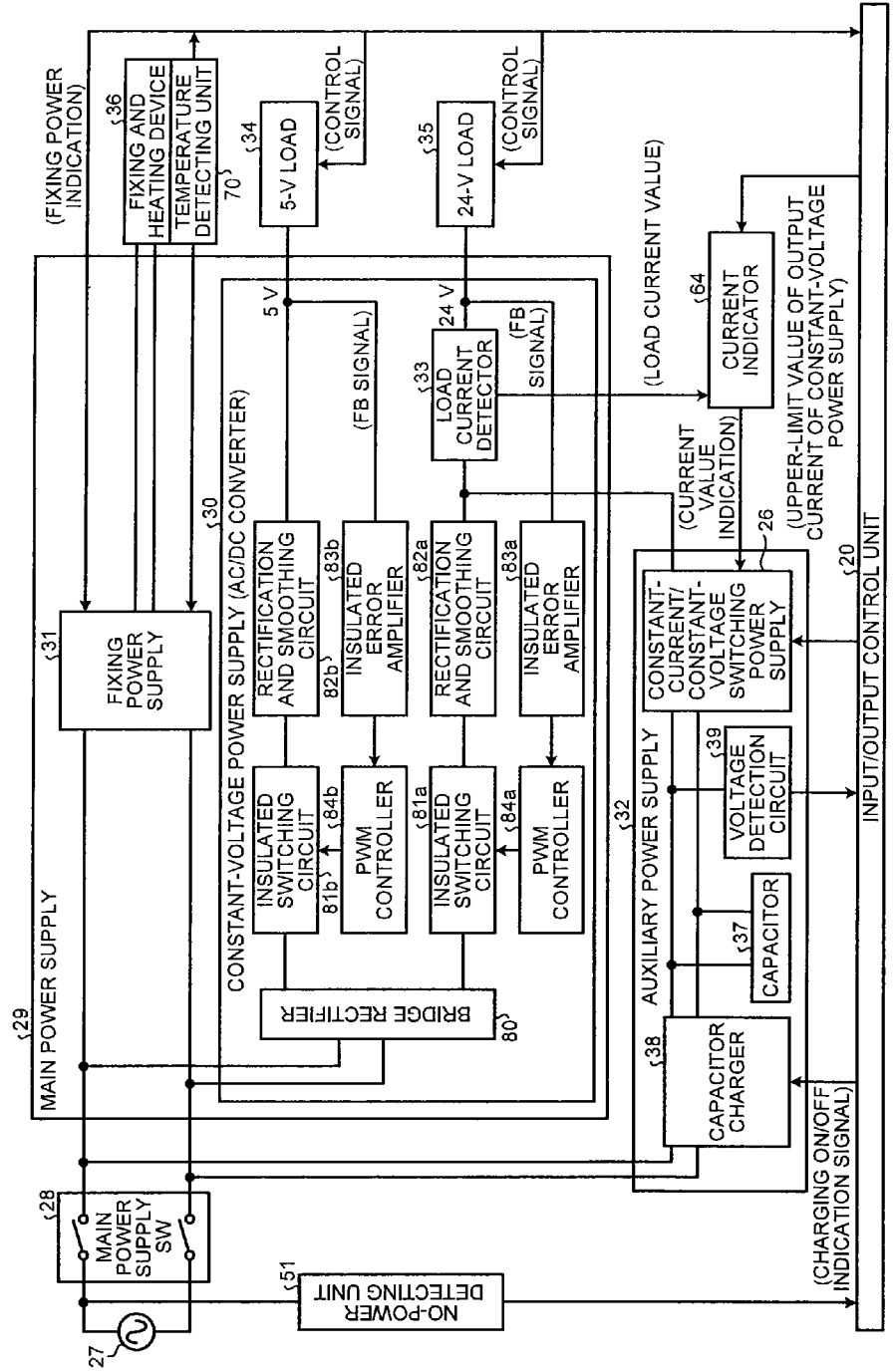
FIG. 3 is an exemplary circuit diagram illustrating a configuration example of a power supply unit that is provided in the full-color digital copying machine according to the embodiment illustrated in FIG. 1.

FIG. 3 is an exemplary circuit diagram illustrating a configuration example of a power supply unit that is provided in the full-color digital copying machine according to the embodiment illustrated in FIG. 1. In the drawings, AC stands for an alternating current and DC stands for a direct current.

In the full-color digital copying machine of this embodiment, when a main power supply switch (hereinafter a "switch" will be referred to as "SW") 28 is turned on, electric power is supplied from a commercial AC power supply 27 to a main power supply 29 and an auxiliary power supply 32.

A commercial AC voltage is applied from the commercial AC power supply 27 to a fixing power supply 31 and a constant-voltage power supply 30 which are AC control circuits of the main power supply 29 and a capacitor charger 38 of the auxiliary power supply 32.

The fixing power supply 31 controls a fixing temperature in a feedback manner using a fixing temperature signal supplied from a temperature detecting unit (a temperature detecting sensor such as a thermistor) 70 within an electric power range designated by an electric power instruction signal that is supplied from an input/output control unit 20. The temperature detecting unit 70 detects a surface temperature (fixing temperature) of the fixing roller 251 of the fixing unit 250 illustrated in FIG. 2.

The constant-voltage power supply 30 of the main power supply 29 is a first power supply that performs a constant-voltage output operation, uses an AC/DC converter, and supplies electric power to a load using AC electric power supplied from the external commercial AC power supply 27 as an external power source. The constant-voltage power supply 30 includes a bridge rectifier 80, insulated switching circuits 81 (81a and 81b), rectification and smoothing circuits 82 (82a and 82b), insulated error amplifiers 83 (83a and 83b), pulse width modulation (PWM) controllers 84 (84a and 84b), and a load current detector 33.

The constant-voltage power supply 30 performs the following operations. The constant-voltage power supply 30 converts the AC voltage from the commercial AC power supply 27 to a DC voltage with the aid of the bridge rectifier 80, the insulated switching circuits 81 (81a and 81b), and the rectification and smoothing circuits 82 (82a and 82b). Moreover, the constant-voltage power supply 30 generates two DC constant voltages of 5 V and 24 V according to constant-voltage feedback control that uses a voltage detection signal supplied to the PWM controllers 84 (84a and 84b) with the aid of the insulated error amplifiers 83 (83a and 83b). The constant-voltage power supply 30 outputs the generated DC constant voltages to a 5-V load (hereinafter, also referred to as a "DC load") 34 and a 24-V load (hereinafter, also referred to as a "DC load") 35. In this case, the constant-voltage power supply 30 supplies a 24-V voltage detection signal (feedback signal) to the insulated error amplifier 83a from the rear stage of the load current detector 33.

Figure 5:
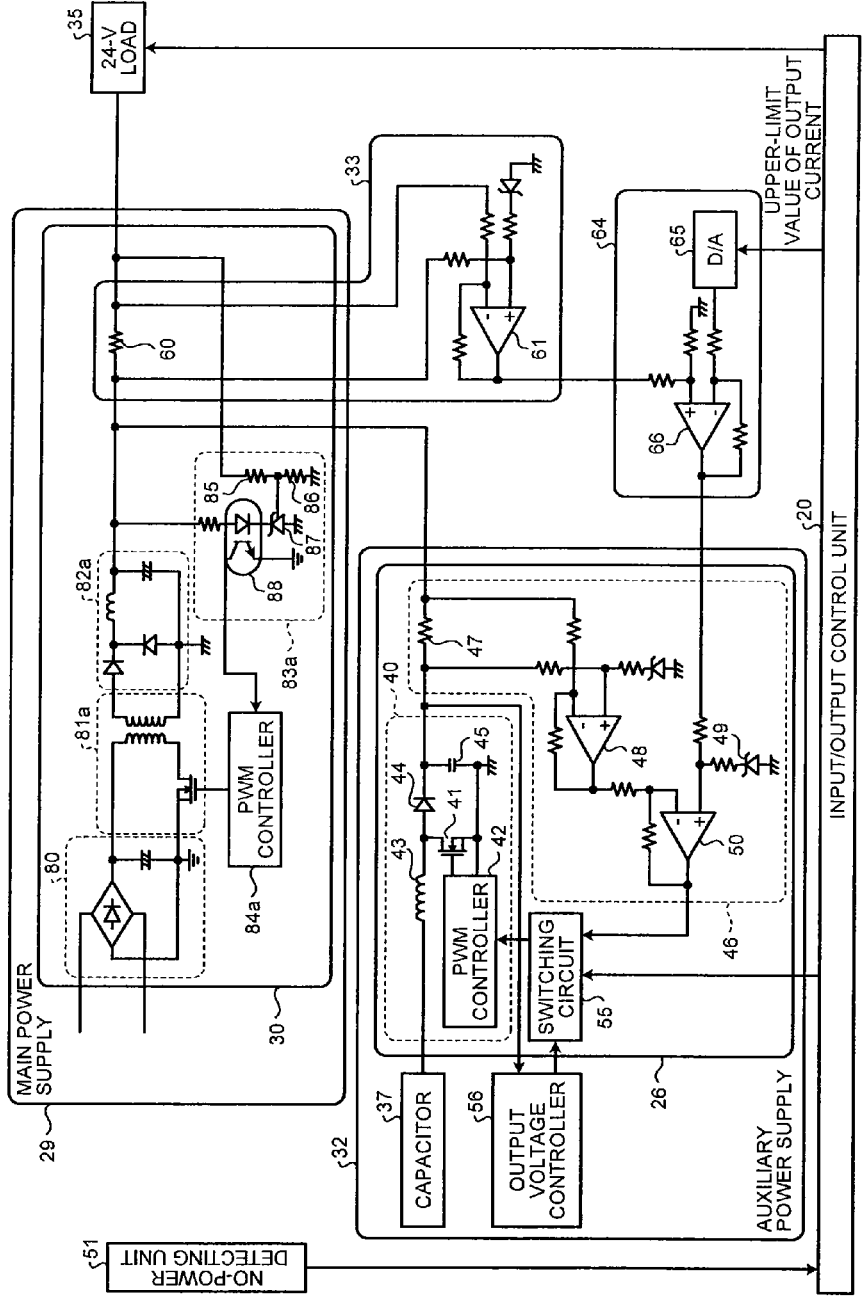
FIG. 5 is an exemplary circuit diagram illustrating a detailed example of a main part within the power supply unit illustrated in FIG. 3.

As illustrated in FIG. 5, in the load current detector 33 which will be described in detail later, a load current detection resistor (hereinafter, referred to simply as a "current detection resistor") 60 of several mΩ is inserted in series to a power supply line. Thus, if voltage-dividing resistors 85 and 86 of the insulated error amplifier 83a, which is at the rear of a voltage detection signal (feedback signal) take-in portion are connected to a front stage of the current detection resistor 60 which is a current sensor, a load application voltage may vary due to fluctuation of a voltage drop in the current detection resistor 60 resulting from fluctuation of a load current value.

For example, when a resistor of 10 MΩ is connected to the current detection resistor 60 of the load current detector 33, and the DC load 35 is changed from 5 A to 15 A, a variation of 0.1 V (10 [mΩ]×(15 [A]-5 [A])) occurs. Further, if the current detection resistor 60 of the load current detector 33 is added to the outside of the main power supply 29, a further application voltage variation of the DC load 35 occurs due to the influence of a wiring resistance.

In order to prevent an application voltage variation of the DC load 35 due to addition of the current detection resistor 60 described above, constant voltage control, that is feedback control is performed to feed a voltage after the addition of the current detection resistor 60 back to the constant-voltage power supply 30 so that the feedback voltage matches a target value.

In this embodiment, the auxiliary power supply 32 includes the capacitor charger 38, a capacitor 37 charged by the capacitor charger 38, and a voltage detection circuit 39 that detects a charged voltage of the capacitor 37. Further, the auxiliary power supply 32 also includes a constant-current/constant-voltage switching power supply 26 that is capable of switching between a constant-current output operation and a constant-voltage output operation and supplies electric power to the 24-V load 35.

The constant-current/constant-voltage switching power supply 26 performs an operation of outputting a constant current or a constant voltage to a power feeding line that supplies the electric power (capacitor electric power) from the capacitor 37 to the 24-V load 35.

The reason why electric power is supplied to the 24-V load 35 using the auxiliary power supply 32 is because the amount of increase in the electric power supplied to a fixing and heating device 36 can be saved from the amount of electric power supplied to the DC load 35 from the constant-voltage power supply 30 that consumes AC electric power, and the corresponding amount can be used as the electric power supplied from the auxiliary power supply 32 to the DC load 35. The fixing and heating device 36 corresponds to a fixing heater (which may be an IH coil unit) included in the fixing roller 251 of FIG. 2.

Thus, in this embodiment, taking the amount (for example, 300 W) of increase in the electric power supplied to the fixing and heating device 36 into consideration, electric power is supplied from the auxiliary power supply 32 to the 24-V load 35 (for example, 500 W) of which the power consumption amount is larger than the 5-V load 34 (for example, 100 W).

When the amount of increase in the electric power supplied to the fixing and heating device 36 is small and when the power consumption amount of the 5-V load 34 is large, electric power may be supplied from the auxiliary power supply 32 to the 5-V load 34.

The load current detector 33 detects a 24-V load current value (hereinafter, also referred to as a "load current value") and supplies a load current signal that indicates (is proportional to) the load current value to a current indicator 64. The 24-V load current value is the sum of current values which are simultaneously supplied by the constant-voltage power supply 30 (the first power supply) and the constant-current/constant-voltage switching power supply 26 (the second power supply).

Further, the input/output control unit 20 supplies upper-limit indication data that designates an upper-limit value of output current (hereinafter, also referred to as an "upper-limit indication value") of the constant-voltage power supply 30 to the current indicator 64.

The current indicator 64 supplies, to the constant-current/constant-voltage switching power supply 26, a current indication signal (control signal) that indicates a value (=output current indication value of the constant-current/constant-voltage switching power supply 26) obtained by subtracting an upper-limit indication value designated by the upper-limit indication data supplied from the input/output control unit 20 from the 24-V load current value indicated by the load current signal supplied from the load current detector 33.

The constant-current/constant-voltage switching power supply 26 performs constant-current control based on the output current indication value indicated by the current indication signal supplied from the current indicator 64 and supplies a constant current to a 24-V load line using the electric power of the capacitor 37.

A no-power detecting unit 51 monitors a voltage of AC electric power supplied from the external commercial AC power supply 27 (power source) and detects, on the basis of the voltage, whether or not the supply of the electric power through the commercial AC line is stopped. The supply of the electric power through the commercial AC line is stopped due to, for example, power failure in the electric power grid that occurs due to natural disaster. Such a power failure in the commercial AC line is exemplified as the stop of power supply in the explanation described below but not limited thereto. For example, when the power plug is pulled out by accident or design, the supply of the electric power through the commercial AC line is stopped. When detecting a power failure (the stop of power supply through the commercial AC line), the no-power detecting unit 51 outputs information (detection information) that indicates the detection of power failure to the input/output control unit 20.

Here, the no-power detecting unit 51, the input/output control unit 20, and the current indicator 64 are part of the 24-V load 35. A separate electric-field capacitor (a component that smooths the 24-V output) is connected to the 24-V load 35. When a power failure occurs, this electric-field capacitor performs an operation of maintaining the level (output level) of the output voltage of the constant-voltage power supply 30 (the first power supply) to a level before the power failure for a predetermined period and gradually decreasing the output level. Thus, even when a power failure occurs, since the supply of electric power is continued for a predetermined period by the operation of the electric-field capacitor connected to the 24-V load 35, the 24-V load 35 can continue its operation during that period only. The output voltage of the constant-voltage power supply 30 (the first power supply) is switched to the output voltage of the constant-current/constant-voltage switching power supply 26 (the second power supply) during that period.

The capacitor 37 of the auxiliary power supply 32 is configured as a large-capacity capacitor such as an electric double-layer capacitor. Although various capacitors other than the electric double-layer capacitor may be selected as the capacitor 37, in this embodiment, it is assumed that an electric double-layer capacitor which can be charged and discharged in short time and provides a long service life is used. However, the electric double-layer capacitor has characteristics that a terminal voltage (capacitor voltage) decreases as the discharge of the capacitor progresses. Thus, the constant-current/constant-voltage switching power supply 26 is disposed at the rear stage of the capacitor 37 so that a necessary current value is output regardless of a voltage variation of the capacitor.

Figure 4:
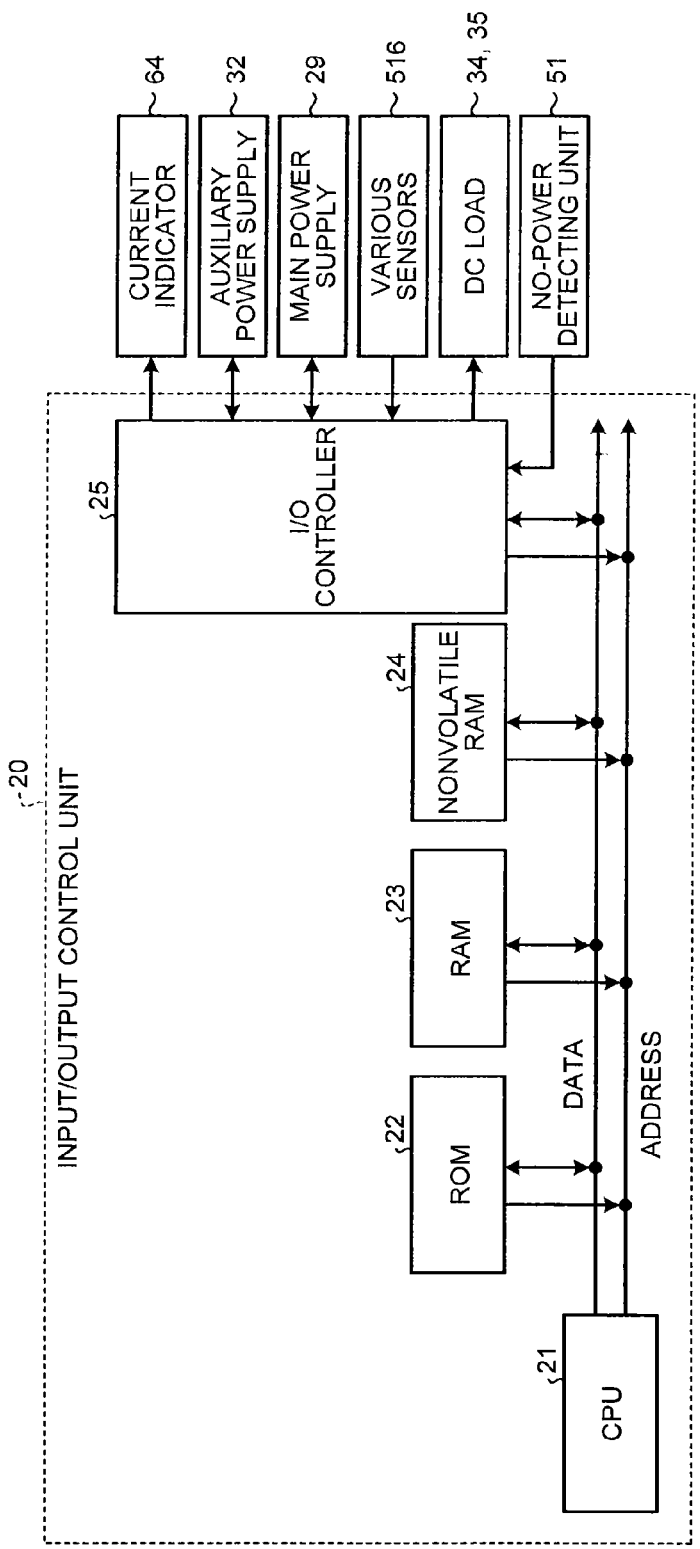
FIG. 4 is an exemplary block diagram illustrating a configuration example of an input/output control unit 20 in the power supply unit illustrated in FIG. 3 together with several peripheral circuits thereof.

FIG. 4 is an exemplary block diagram illustrating a configuration example of the input/output control unit 20 in the power supply unit illustrated in FIG. 3 together with several peripheral circuits thereof.

The input/output control unit 20 includes a CPU 21, a ROM 22, a RAM 23, a nonvolatile RAM 24, and an I/O controller 25. The CPU 21 controls the input and output of various sensors 516 and the respective DC loads 34 and 35 and controls the power supply unit according to a control command from an engine control unit (not illustrated), a program stored in the ROM 22, and a program and data stored in the nonvolatile RAM 24.

The ROM 22 stores a program for operating the CPU 21.

The RAM 23 is used as a working memory of the CPU 21.

The nonvolatile RAM 24 stores an operating state of the respective DC loads 34 and 35 and various data.

The I/O controller 25 controls reading of the input of various sensors 516 of the full-color digital copying machine 1 and controls driving of the respective DC loads 34 and 35.

The input/output control unit 20 controls the processes of the engine control unit reading, printing, and copying images, controls the power supply and the input and output of various sensors 516 and the respective DC loads 34 and 35 according to an instruction associated with sequence control. The input/output control unit 20 sequentially operates the respective DC loads 34 and 35 according to each operating mode. Further, the input/output control unit 20 controls charging and discharging of the capacitor 37. For example, the input/output control unit 20 supplies the electric power stored in the capacitor 37 to the 24-V load 35 during the startup of the apparatus and in a predetermined period after the startup. In this case, the input/output control unit 20 increases the amount of electric power supplied to the fixing and heating device 36 with excess electric power occurring in the electric power supplied from the commercial AC power supply (AC line) 27. Further, when the power failure detection information is input from the no-power detecting unit 51, the input/output control unit 20 performs control of switching the output operation of the constant-current/constant-voltage switching power supply 26 from a constant-current output operation to a constant-voltage output operation using a switching circuit 55 described later. Thus, the input/output control unit 20 can perform the function as an output switching unit together with the switching circuit 55.

FIG. 5 is an exemplary circuit diagram illustrating a detailed example of a main part within the power supply unit illustrated in FIG. 3. FIG. 5 mainly illustrates the details of the constant-voltage power supply 30, the constant-current/constant-voltage switching power supply 26, the load current detector 33, and the current indicator 64.

In the constant-voltage power supply 30 of the main power supply 29, a shunt regulator 87 amplifies and compares a voltage detection signal obtained by dividing the voltage at the rear stage (closer to the 24-V load 35) of the current detection resistor 60 included in the load current detector 33 using the voltage-dividing resistors 85, 86 of the insulated error amplifier 83a with a reference voltage. The constant-voltage power supply 30 insulates the compared and amplified voltage detection signal with the aid of a photocoupler 88 and supplies the insulated voltage detection signal to a PWM controller 84a as a feedback signal (detection voltage) for constant-voltage control. Thus, the insulated error amplifier 83a performs the function as a voltage detecting unit.

The PWM controller 84a of the constant-voltage power supply 30 performs constant-voltage control on a load application voltage (corresponding to the output voltage of the constant-voltage power supply 30) which is a voltage immediately before being supplied to the 24-V load 35, that is, the voltage of a power feeding line between the current detection resistor 60 and the 24-V load 35. That is, the PWM controller 84a performs a constant-voltage output operation so that a voltage (detected output voltage) indicated by a voltage detection signal supplied as a feedback signal matches a target voltage value described later that is set to the PWM controller 84a. In this case, when the voltage indicated by the voltage detection signal is out of a guaranteed voltage range described later that is set to the PWM controller 84a, the PWM controller 84a stops the constant-voltage output operation. Thus, the PWM controller 84a performs the function as a control unit.

When the constant-voltage output operation of the constant-voltage power supply 30 stops, the input/output control unit 20 outputs a notification to the engine control unit (not illustrated) to inform that the constant-voltage output operation stops. Upon receiving the notification informing that the constant-voltage output operation of the constant-voltage power supply 30 stops, the engine control unit stops image formation if image formation is being performed.

In this embodiment, the capacitor 37 of the auxiliary power supply 32 is an electric double-layer capacitor. The electric double-layer capacitor has a low withstand voltage and an upper-limit charging voltage in use is 2.5 V. Thus, a large number of capacitors need to be connected in series to obtain a high voltage. However, the use of a small number of large-capacity capacitors enables the same capacity to be obtained at a lower cost than the use of a large number of small-capacity capacitors connected in series. In order to feed electric power to the 24-V load 35, since the upper-limit charging voltage becomes 22.5 V or lower when nine or a smaller number of series-connected electric double-layer capacitors are used, it is necessary to form the constant-current/constant-voltage switching power supply 26 using a step-up regulator.

Thus, in this embodiment, a step-up regulator 40 of the constant-current/constant-voltage switching power supply 26 steps up the electric power of the capacitor 37 and outputs a constant current.

A semiconductor switch 41 of the step-up regulator 40 enters a conductive (ON) state in a high level "H" period of the output PWM pulse of a PWM controller 42 and enters a non-conductive (OFF) state in the low level "L" period of the output PWM pulse.

When the semiconductor switch 41 enters the conductive state, current flows from the capacitor 37 to a reactor 43 and the semiconductor switch 41, and the reactor 43 stores electric power. When the semiconductor switch 41 switches to the non-conductive state, the electric power stored in the reactor 43 becomes a high voltage and the high voltage is charged to a capacitor 45 through a diode 44.

The voltage of the capacitor 45 rises when the semiconductor switch 41 is repeatedly turned on and off according to a PWM pulse cycle. The voltage is supplied to the 24-V load 35 through a current detection resistor 47 of an output current controller 46 and the current detection resistor 60 of the load current detector 33.

The load current detector 33 amplifies a potential difference between both ends of the current detection resistor 60 with the aid of a differential amplifier 61 to generate a load current signal (analog voltage) proportional to the load current value and outputs (applies) the load current signal to the current indicator 64.

The current indicator 64 includes a D/A converter 65 and a differential amplifier 66. The D/A converter 65 converts the upper-limit indication data that designates the upper-limit value of output current supplied by the input/output control unit 20 into an upper-limit indication signal (voltage). The differential amplifier 66 calculates "(load current value)–(upper-limit current value)". The current indicator 64 outputs a difference voltage that indicates the calculation result to the constant-current/constant-voltage switching power supply 26 as a current indication signal.

That is, the current indicator 64 sets a difference value obtained by subtracting a upper-limit value of output current of the constant-voltage power supply 30 indicated by the input/output control unit 20 from the load current value detected by the load current detector 33 as a target current value to be achieved by the constant-current/constant-voltage switching power supply 26. The current indicator 64 indicates an output current indication value corresponding to the target current value to the constant-current/constant-voltage switching power supply 26.

The constant-current/constant-voltage switching power supply 26 includes the step-up regulator 40, the output current controller 46, and the switching circuit 55. The output current controller 46 includes a current detection resistor 47, a differential amplifier 48, a bias circuit 49, and a differential amplifier 50. The differential amplifier 48 amplifies a potential difference between both ends of the current detection resistor 47 to generate an output current signal proportional to the output current value and supplies the output current signal to the differential amplifier 50.

Moreover, the differential amplifier 50 amplifies a difference between the output current signal and the output current indication value supplied by the current indicator 64, adds a voltage supplied by the bias circuit 49 to the amplified difference, and supplies an addition result to the PWM controller 42 of the step-up regulator 40 as a duty indication signal of a PWM pulse.

The PWM controller 42 determines the duty of the PWM pulse that turns on and off the semiconductor switch 41 so as to correspond to the duty designated by the duty indication signal. That is, the PWM controller 42 increases the duty of the PWM pulse when the output signal of the current indicator 64 increases so that the output voltage of the differential amplifier 50 increases. As a result, the output current value of the step-up regulator 40 increases.

In this manner, when the voltage drop in the current detection resistor 47 increases, and the level of the output current detection signal increases so that the output voltage of the differential amplifier 50 decreases, the duty of the PWM pulse decreases. As a result, the output current value of the step-up regulator 40 decreases.

As a result of such feedback PWM control, a value corresponding to a difference obtained by subtracting the upper-limit value of output current of the constant-voltage power supply 30 indicated by the input/output control unit 20 from the load current value (24-V load current detection value) supplied by the current indicator 64 becomes the output current value of the step-up regulator 40.

Next, details of the configurations mounted on the load current detector 33 will be described. The load current detector 33 includes the current detection resistor 60 and the differential amplifier 61.

The current detection resistor 60 is mounted on the same substrate as part of the constant-voltage power supply 30 of the main power supply 29. The current detection resistor 60 is connected to the differential amplifier 61 and resistors associated thereto which are provided on a substrate different from that of the constant-voltage power supply 30 (main power supply 29) by a connector and a harness using the voltage between both ends of the current detection resistor 60 as an interface signal between the substrates.

With this configuration, it is possible to minimize deterioration in the output accuracy of the constant-voltage power supply 30 due to an extension (delaying) of the constant-voltage feedback loop of the constant-voltage power supply 30. That is, it is possible to suppress an increase in the cost of the constant-voltage power supply 30 resulting from a remote sensing capability of the constant-voltage power supply 30.

Further, when an auxiliary power supply system (a combination of the auxiliary power supply 32, the current indicator 64, and the load current detector 33) is made optional, and the auxiliary power supply system is assumed to be not present, even if a main power supply system (main power supply 29) is not changed, the auxiliary power supply 32, the current indicator 64, the differential amplifier 61 of the load current detector 33, and the resistors associated thereto can be easily removed from the main power supply system. Thus, the cost of the main power supply system (main power supply 29) is increased by an amount corresponding to the addition of the current detection resistor 60. That is, a main power supply system configured such that the auxiliary power supply system can be connected thereto does not increase the cost significantly.

Even if the auxiliary power supply system is removed in the above-described manner, when the current detection resistor 60 is provided in the main power supply 29, electric power consumption of the current detection resistor 60 occurs in a power supply unit that is not connected to the auxiliary power supply system. For example, when the current detection resistor 60 of 10 mΩ is connected and an operation load is 15 A, electric power consumption of 2.25 W occurs.

In a light load state such as during a standby period, the amount of electric power consumption has a smaller value. In order to deal with a problem in which unnecessary electric power consumption occurs, the current detection resistor 60 may be not mounted and a jumper line may be connected instead. According to this configuration, it is sufficient to change the configuration slightly and complication of the configuration of the main power supply 29 can be prevented. Further, it is possible to further decrease the cost of the main power supply 29 when the auxiliary power supply system is not mounted.

Alternatively, the entire load current detector 33 that includes the differential amplifier 61 and resistors associated thereto may be mounted on the same substrate as part of the constant-voltage power supply 30 of the main power supply 29 and may be connected to the current indicator 64 provided on a substrate that is different from that of the constant-voltage power supply 30 (main power supply 29) by a connector and a harness using the load current signal output by the differential amplifier 61 as an interface signal between the substrates. According to this configuration, although the cost of the main power supply 29 is increased by an amount corresponding to the differential amplifier 61 and the resistors associated thereto as compared to the above configuration, it is possible to obtain approximately the same advantages. Further, it is possible to increase a noise tolerance amount by delivering amplified signals. That is, it is possible to improve stability of a current detecting function.

On the other hand, when a power failure occurs, the power failure is detected by the no-power detecting unit 51, and information (power failure detection information) that indicates the detection of power failure is sent to the input/output control unit 20.

Upon receiving the power failure detection information, the input/output control unit 20 sends a switching signal to the switching circuit 55.

Upon receiving the switching signal, the switching circuit 55 switches the output operation of the constant-current/constant-voltage switching power supply 26 (the second power supply) that performs an output operation (constant-current output operation) based on constant-current control to an output operation (constant-voltage output operation) based on constant-voltage control.

An output voltage controller 56 is configured to perform constant-voltage control. The output voltage controller 56 is configured to amplify and compare a voltage detection signal obtained by dividing the output voltage of the step-up regulator 40 with the aid of a voltage-dividing resistor with a reference voltage with the aid of the shunt regulator, amplifies the voltage detection signal similarly to the insulated error amplifier 83a, for example, insulates the compared and amplified voltage detection signal with the aid of a photocoupler, and supplies the insulated voltage detection signal to the PWM controller 42 as a feedback signal for constant-voltage control. Thus, the output voltage controller 56 performs the function as a voltage detecting unit.

The switching circuit 55 may be a unit for transmitting the output based on constant-current control or the output based on constant-voltage control to the PWM controller 42. The switching circuit 55 is configured as a switch component, for example, a relay element.

The PWM controller 42 performs constant-voltage control on a load application voltage (corresponding to an output voltage of the constant-current/constant-voltage switching power supply 26) which is a voltage of a power feeding line between the PWM controller 42 and the 24-V load 35. Specifically, the PWM controller 42 performs a constant-voltage output operation so that a voltage indicated by the voltage detection signal supplied as a feedback signal matches a target voltage value described later that is set to the PWM controller 42. In this case, when the voltage indicated by the voltage detection signal is out of a guaranteed voltage range described later that is set to the PWM controller 42, the PWM controller 42 stops the constant-voltage output operation. Thus, the PWM controller 42 performs the function as a control unit.

When the constant-voltage output operation of the constant-current/constant-voltage switching power supply 26 stops, the input/output control unit 20 outputs a notification to the engine control unit (not illustrated) to inform that the constant-voltage output operation stops. Upon receiving the notification informing that the constant-voltage output operation of the constant-current/constant-voltage switching power supply 26 stops, the engine control unit stops image formation if image formation is being performed.

Next, the output voltage setting values of the constant-voltage power supply 30 (the first power supply) and the constant-current/constant-voltage switching power supply 26 (the second power supply) illustrated in FIG. 5 will be described. Before beginning the description, for the convenience of understanding, an output abnormality during a power failure recovery based on the setting of the output voltage setting value in the power supply unit of the related art will be described with reference to FIG. 8. FIG. 5 will also be referred to for the sake of convenience.

Figure 8:
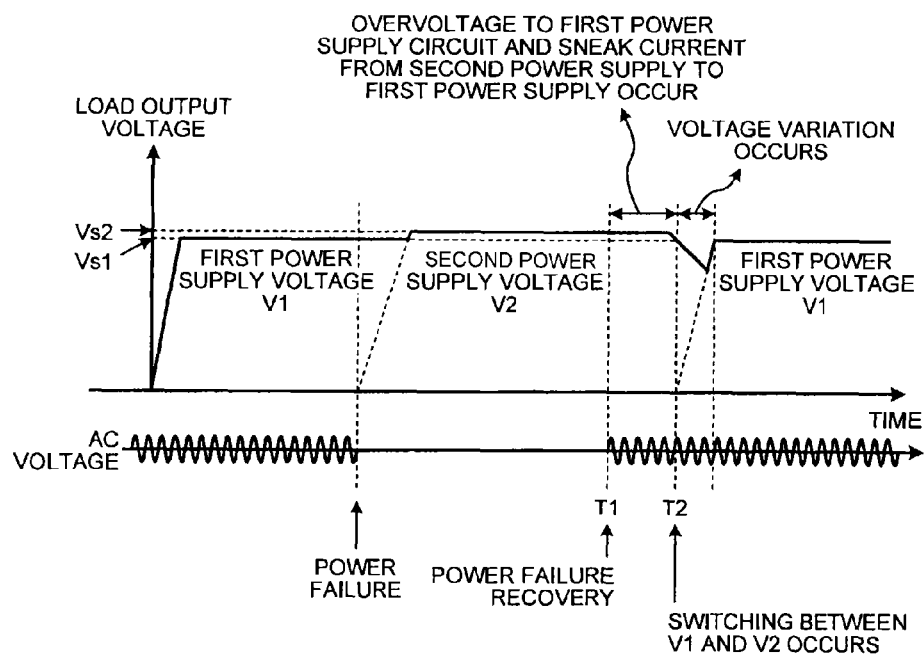
FIG. 8 is an exemplary diagram illustrating an example of a state transition of an output voltage of each of a constant-voltage power supply (first power supply) and a constant-current/constant-voltage switching power supply (second power supply) of a conventional power supply unit.

FIG. 8 is an exemplary diagram illustrating an example of a state transition of an output voltage of each of a constant-voltage power supply (first power supply) and a constant-current/constant-voltage switching power supply (second power supply) of a conventional power supply unit.

In the conventional power supply unit, it is assumed that an output voltage of the constant-voltage power supply 30 (the first power supply) is V1, an output voltage of the constant-current/constant-voltage switching power supply 26 (the second power supply) is V2, an output voltage setting value (output voltage value) which is a target voltage value of the constant-voltage power supply 30 (the first power supply) is Vs1 (corresponding to the first setting value), and an output voltage setting value which is a target voltage value of the constant-current/constant-voltage switching power supply 26 (the second power supply) is Vs2 (corresponding to the second setting value). Moreover, it is assumed that the output voltage setting values Vs1 and Vs2 of the constant-voltage power supply 30 and the constant-current/constant-voltage switching power supply 26 are set so as to satisfy a relation of Vs1<Vs2. In this case, as illustrated in FIG. 8, when power is input and a constant-voltage output operation of the constant-voltage power supply 30 (the first power supply) starts, the output voltage V1 rises so that the output voltage V1=Vs1.

After that, when a power failure occurs, no power is supplied to the constant-voltage power supply 30 (the first power supply), and the constant-voltage output operation of the constant-voltage power supply 30 (the first power supply) is switched to the constant-voltage output operation of the constant-current/constant-voltage switching power supply 26 (the second power supply). However, even when a power failure occurs, as described above, by the function of the electric-field capacitor connected to the 24-V load 35, the output voltage to the 24-V load 35 maintains V1=Vs1 until the output voltage V2 of the constant-current/constant-voltage switching power supply 26 (the second power supply) rises.

Moreover, when the output voltage V2 of the constant-current/constant-voltage switching power supply 26 (the second power supply) rises to the output voltage setting value Vs2 so that V2>Vs1, the output voltage of the 24-V load 35 is switched to the output voltage V2.

After that, although the power failure is recovered, an output abnormality occurs immediately after the power failure recovery.

That is, as illustrated in FIG. 8, in a period between a power failure recovery (t1) and a time (t2) when the outputs of the constant-voltage power supply 30 (the first power supply) and the constant-current/constant-voltage switching power supply 26 (the second power supply) are switched, V2>V1, and the constant-current/constant-voltage switching power supply 26 outputs a voltage V2 that is identical to the output voltage setting value Vs2. Thus, no switching occurs in the PWM controller 84*a* illustrated in FIG. 5. Due to this, the voltage V1 is not output from the constant-voltage power supply 30 (the first power supply), but V1=0. Thus, an overvoltage to the constant-voltage power supply 30 (the first power supply) due to the output voltage V2 of the constant-current/constant-voltage switching power supply 26 (the second power supply) and a sneak current from the constant-current/constant-voltage switching power supply 26 to the constant-voltage power supply 30 may occur.

After the power failure recovery, the constant-current/constant-voltage switching power supply 26 (the second power supply) tries to stop the constant-voltage output operation. Thus, the output voltage V2 gradually decreases, and when Vs1≥V2, the constant-voltage output operation of the constant-current/constant-voltage switching power supply 26 (the second power supply) is switched to the constant-voltage output operation of the constant-voltage power supply 30 (the first power supply), and the output voltage V1 rises. Due to this, the output voltage to the 24-V load 35 is switched from the output voltage V2 to the output voltage V1.

Further, due to the above reasons, since the constant-voltage output operation of the constant-voltage power supply 30 (the first power supply) does not start until the output voltage V2 of the constant-current/constant-voltage switching power supply 26 (the second power supply) becomes Vs1≥V2, the rising of the output voltage V1 is delayed. The output of the constant-current/constant-voltage switching power supply 26 (the second power supply) corresponding to the amount for charging the capacitor 45 illustrated in FIG. 5 is maintained. However, due to the delayed rising of the constant-voltage power supply 30 (the first power supply), a voltage variation occurs when the output voltage V2 is switched to the output voltage V1.

As described above, if the output voltage setting values Vs1 and Vs2 of the constant-voltage power supply 30 and the constant-current/constant-voltage switching power supply 26 are in the relation of Vs1<Vs2, an output abnormality occurs immediately after the power failure recovery.

Thus, in this embodiment, the output abnormality is eliminated by setting the output voltage setting values to satisfy a relation of Vs1>Vs2.

Figure 6:
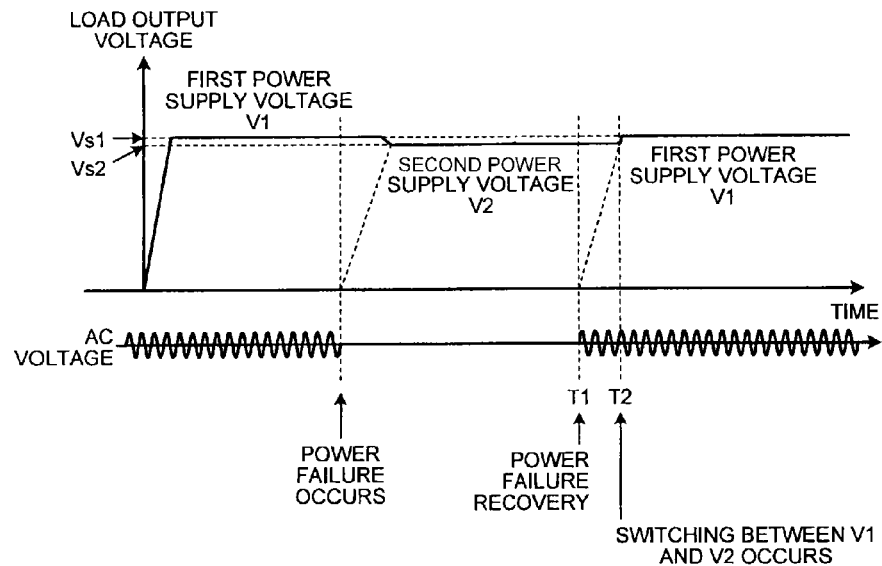
FIG. 6 is an exemplary diagram illustrating an example of a state transition of an output voltage of each of a constant-voltage power supply 30 (the first power supply) and a constant-current/constant-voltage switching power supply 26 (the second power supply) illustrated in FIG. 5.

FIG. 6 illustrates an example of a state transition of an output voltage of each of the constant-voltage power supply 30 (the first power supply) and the constant-current/constant-voltage switching power supply 26 (the second power supply) illustrated in FIG. 5.

In this embodiment, the output voltage setting values Vs1 and Vs2 of the constant-voltage power supply 30 and the constant-current/constant-voltage switching power supply 26 are set so that the output voltage setting value Vs1 of the constant-voltage power supply 30 (the first power supply) and the output voltage setting value Vs2 of the constant-current/constant-voltage switching power supply 26 (the second power supply) satisfy a relation of Vs1>Vs2. Thus, it is possible to prevent an overvoltage and a sneak current which occur in the conventional power supply unit.

Moreover, as illustrated in FIG. 6, the constant-voltage power supply 30 (the first power supply) rises immediately after the power failure recovery (t1). Due to this, since switching from the output voltage V2 of the constant-current/constant-voltage switching power supply 26 (the second power supply) to the output voltage V1 of the constant-voltage power supply 30 (the first power supply) can be performed immediately, a voltage variation does not occur.

Further, according to the configuration of this embodiment, since it is only necessary to set the output voltage setting values of the constant-voltage power supply 30 (the first power supply) and the constant-current/constant-voltage switching power supply 26 (the second power supply), no complex setting on the circuit is required.

When a power failure occurs, the no-power detecting unit 51 detects the power failure. When the power failure is detected, the input/output control unit 20 operates the PWM controller 42 illustrated in FIG. 5 to cause the capacitor 37 to output a voltage to the 24-V load 35 according to constant-voltage control. Specifically, the input/output control unit 20 switches the output voltage to the 24-V load 35 from the output voltage V1 of the constant-voltage power supply 30 (the first power supply) to the output voltage V2 of the constant-current/constant-voltage switching power supply 26 (the second power supply).

After a power failure recovery, the constant-current/constant-voltage switching power supply 26 (the second power supply) tries to stop the constant-voltage output operation. During the power failure recovery, since the output voltage V2 and the output voltage setting value Vs1 are in the relation of Vs1≥V2, the constant-voltage output operation of the constant-voltage power supply 30 (the first power supply) starts immediately.

However, due to the function of the electric-field capacitor connected to the 24-V load 35, the output voltage to the 24-V load 35 becomes V2=Vs2 until the output voltage V1 of the constant-voltage power supply 30 (the first power supply) rises.

Moreover, when the output voltage V1 of the constant-voltage power supply 30 (the first power supply) rises to the target voltage value Vs1 and becomes V1≥V2, the output voltage to the 24-V load 35 is switched to the output voltage V1. When V1≥V2, the constant-voltage output operation of the constant-current/constant-voltage switching power supply 26 (the second power supply) can be stopped.

The output voltage setting value V1 of the constant-voltage power supply 30 (the first power supply) is set in advance to the PWM controller 84a in the constant-voltage power supply 30. The output voltage setting value V2 of the constant-current/constant-voltage switching power supply 26 (the second power supply) is set in advance to the PWM controller 42 of the step-up regulator 40 in the constant-current/constant-voltage switching power supply 26. These settings may be performed before shipping the apparatus 1 and may be performed after the shipping. However, the output voltage setting values V1 and V2 can be set according to an indication signal from the input/output control unit 20 before shipping the apparatus 1 or after the shipping (when the apparatus 1 is powered on). For example, when the apparatus 1 is powered on, the input/output control unit 20 can variably set the output voltage setting value V2 by outputting an indication signal to the PWM controller 42 via the switching circuit 55.

Next, setting of the output voltage ranges of the constant-voltage power supply 30 (the first power supply) and the constant-current/constant-voltage switching power supply 26 (the second power supply) illustrated in FIG. 5 will be described.

Figure 7:
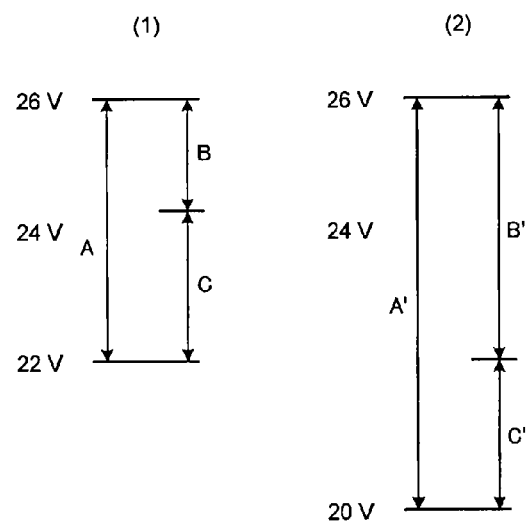
FIG. 7 illustrates an example of different output voltage ranges of the constant-voltage power supply 30 (the first power supply) and the constant-current/constant-voltage switching power supply 26 (the second power supply)

FIG. 7 illustrates an example of different output voltage ranges.

In (1) and (2) of FIG. 7, "a" and "a'" represent an example of different predetermined voltage ranges (guaranteed voltage ranges) to the 24-V load 35 illustrated in FIG. 5 when the constant-voltage power supply 30 (the first power supply) and the constant-current/constant-voltage switching power supply 26 (the second power supply) illustrated in FIG. 5 perform a constant-voltage output operation. In a general system, the guaranteed voltage ranges a and a' are output voltage ranges that are guaranteed by a power supply unit (PSU).

The output voltage range a or a' is divided into two ranges. One divided output voltage range b or b' is set to the PWM controller 84a in the constant-voltage power supply 30 (the first power supply). The other divided output voltage range c or c' is set to the PWM controller 42 of the step-up regulator 40 in the constant-current/constant-voltage switching power supply 26 (the second power supply).

In (1) of FIG. 7, the image guaranteed voltage range a (a voltage range where optimal image output is possible) which is a predetermined voltage range to the 24-V load 35 is divided into two output voltage ranges b and c. The output voltage ranges b and c are set to the PWM controller 84a in the constant-voltage power supply 30 and the PWM controller 42 of the step-up regulator 40 in the constant-current/constant-voltage switching power supply 26 as the guaranteed voltage range that includes the target voltage value in the constant-voltage output operation. Thus, even when a power failure occurs in the apparatus 1 in the voltage range of the 24-V load 35, it is possible to perform operations without causing image defects (color unevenness and color shift).

The output voltage range of the constant-voltage power supply 30 (the first power supply) is set in advance to the PWM controller 84a in the constant-voltage power supply 30. The output voltage range of the constant-current/constant-voltage switching power supply 26 (the second power supply) is set in advance to the PWM controller 42 of the step-up regulator 40 in the constant-current/constant-voltage switching power supply 26. These settings may be performed before shipping the apparatus 1 and may be performed after the shipping. However, the output voltage setting values can be set according to an indication signal from the input/output control unit 20 before shipping the apparatus 1 or after the shipping (when the apparatus 1 is powered on). For example, when the apparatus 1 is powered on, the input/output control unit 20 can variably set the output voltage setting value V2 by outputting an indication signal to the PWM controller 42 via the switching circuit 55.

Moreover, when the 24-V load 35 is not in an operating state, the input/output control unit 20 may perform the following control. Specifically, the input/output control unit 20 changes the output voltage ranges of the constant-voltage power supply 30 (the first power supply) and the constant-current/constant-voltage switching power supply 26 (the second power supply). For example, the input/output control unit 20 changes the image guaranteed voltage range as illustrated in (1) of FIG. 7, which is a predetermined voltage range to the 24-V load 35 to the wider operation guaranteed voltage range a' (a voltage range where a normal operation is possible) illustrated in (2) of FIG. 7. Moreover, the input/output control unit 20 divides the operation guaranteed voltage range a' into two output voltage ranges b' and c' and sets the output voltage ranges b' and c' to the PWM controller 84a in the constant-voltage power supply 30 and the PWM controller 42 of the step-up regulator 40 in the constant-current/constant-voltage switching power supply 26 together with the above-described target voltage values.

The output voltage range b' of the constant-voltage power supply 30 (the first power supply) is a guaranteed voltage range that is guaranteed by a power supply unit of a normal system.

When the set output voltage range of the constant-voltage power supply 30 (the first power supply) is narrowed to the output voltage range b illustrated in (1) of FIG. 7, it is possible to increase the constant voltage accuracy.

Moreover, when the set output voltage range of the constant-current/constant-voltage switching power supply 26 (the second power supply) is widened to the output voltage range b' illustrated in (2) of FIG. 7, it is not necessary to narrow the output voltage range of the constant-voltage power supply 30 (the first power supply) to increase the constant voltage accuracy unlike the output voltage range b illustrated in (1) of FIG. 7. Thus, it is advantageous to the output voltage range b from the perspective of cost. That is, when the output voltage range b' is widened, since components in which fluctuation is reduced can be used as components used for the constant-voltage output operation, it is possible to select low-cost components.

By setting the output voltage range c or c' of the constant-current/constant-voltage switching power supply 26 (the second power supply) under the output voltage range b or b' of the constant-voltage power supply 30 (the first power supply), the constant-current/constant-voltage switching power supply 26 can supply electric power to the 24-V load 35 during a power failure.

Here, the input/output control unit 20 checks the state of the apparatus 1, operates the PWM controllers 84a and 42 according to the checking result, and sets the predetermined voltage range to the 24-V load 35. For example, when the apparatus 1 is in an operating state, the input/output control unit 20 sets the voltage range as illustrated in (1) of FIG. 7. When the apparatus 1 is in a standby state (the 24-V load 35 is not in the operating state), the input/output control unit 20 sets the voltage range as illustrated in (2) of FIG. 7.

In this embodiment, the input/output control unit 20 of the power supply unit causes the constant-current/constant-voltage switching power supply 26 (the second power supply) to perform a constant-current output operation in normal times, and switches the constant-current/constant-voltage switching power supply 26 (the second power supply) to perform a constant-voltage output operation using the switching circuit 55 when a power failure is detected by the no-power detecting unit 51. Further, the target voltage values in the constant-voltage output operation of the constant-voltage power supply 30 (the first power supply) and the constant-current/constant-voltage switching power supply 26 (the second power supply) are set so that the output voltage when the constant-current/constant-voltage switching power supply 26 performs a constant-voltage output operation is smaller than the output voltage when the constant-voltage power supply 30 performs a constant-voltage output operation. Thus, even when a power failure occurs, it is possible to realize a normal power failure recovery without causing a power supply output abnormality and complicating the circuit.

Further, output voltage ranges obtained by dividing the predetermined voltage range for the 24-V load 35 when the constant-voltage output operation is performed into two ranges are set to the constant-voltage power supply 30 (the first power supply) and the constant-current/constant-voltage switching power supply 26 (the second power supply) as guaranteed voltage ranges that include the target voltage values in the constant-voltage output operation. Moreover, the constant-voltage power supply 30 (the first power supply) and the constant-current/constant-voltage switching power supply 26 (the second power supply) detect the output voltages thereof when the power supplies perform the constant-voltage output operation and performs the constant-voltage output operation so that the detected output voltages match the target voltage values. When the detected output voltages are out of the guaranteed voltage ranges set thereto, the constant-voltage power supply 30 (the first power supply) and the constant-current/constant-voltage switching power supply 26 (the second power supply) stop the constant-voltage output operation. Therefore, even when a power failure occurs, it is possible to perform operations without causing image defects (color unevenness and color shift).

Here, when a power failure occurs during the operation of the apparatus 1, switching is performed so that output is supplied from the constant-current/constant-voltage switching power supply 26 (the second power supply). As illustrated in (1) of FIG. 7, the image guaranteed voltage range a to the 24-V load 35 is 22 V to 26 V, and the output voltage range b set to the constant-current/constant-voltage switching power supply 26 (the second power supply) is 22 V to 24 V.

Thus, when the output voltage from the constant-current/constant-voltage switching power supply 26 (the second power supply) is out of the image guaranteed voltage range b, for example, a motor, a solenoid, and a clutch may operate erroneously or in worst case may stop, and it is not possible to guarantee properly printed images. However, when the output voltage ranges b and c of the constant-voltage power supply 30 (the first power supply) and the constant-current/constant-voltage switching power supply 26 (the second power supply) are set to fall within the image guaranteed voltage range a, even when a power failure occurs, if the output voltage of the constant-current/constant-voltage switching power supply 26 (the second power supply) is within the image guaranteed voltage range b, it is possible to print proper images without the operation to deviate or stop.

In the embodiments described above, the constant-current/constant-voltage switching power supply 26 is provided as the second power supply and performs constant-current output operation in normal times; the input/output control unit 20 switches the constant-current/constant-voltage switching power supply 26 from the constant-voltage output operation to the constant-current output operation when a power failure is detected. However, the second power supply is not limited to such a power supply that can switch between the constant-voltage output operation and the constant-current output operation. The second power supply may be any power supply that can supply electric power to the load during a power failure. For example, a power unit that supplies electric power during a power failure but does not supply electric power in normal times. In this case, the input/output control unit 20 is configured to switch the electric power to be supplied to the load from the electric power of the first power supply to the electric power of the second power supply when a power failure is detected. In this configuration, when the relation between the output voltage setting value Vs1 of the first power supply and the output voltage setting value Vs2 of the second power supply satisfies Vs1>Vs2, it is possible to avoid an abnormality in the output during a power failure recovery.

According to the embodiments, a recovery can be properly realized without causing an abnormality in the output of a power supply even when a power failure occurs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply unit comprising:
   a first power supply configured to supply electric power to a load using electric power supplied from an external power source;
   a second power supply including an electric storage unit configured to store the electric power supplied from the external power source, the second power supply being configured to supply the electric power stored in the electric storage unit to the load;

a no-power detecting unit configured to monitor a voltage of the external power source and detect that no electric power is supplied from the external power source; and an output switching unit configured to switch the electric power to be supplied to the load to the electric power supplied from the second power supply when the no-power detecting unit detects that no electric power is supplied from the external power source, wherein a first setting value that is a target output voltage of the first power supply is larger than a second setting value that is a target output voltage of the second power supply, among two output voltage ranges into which a predetermined voltage range for the load is divided, one of the output voltage ranges that includes the first setting value is set as a guaranteed voltage range of the first power supply, and the other output voltage range that includes the second setting value is set as a guaranteed voltage range of the second power supply, and each of the first power supply and the second power supply includes a voltage detecting unit configured to detect an output voltage, and a control unit configured to operate such that the output voltage detected by the voltage detecting unit becomes the target output voltage and stop operating when the output voltage detected by the voltage detecting unit is out of the guaranteed voltage range.

2. An image forming apparatus comprising the power supply unit according to claim 1, wherein the image forming apparatus performs image formation using the electric power supplied from the power supply unit, and stops the image formation when the operation of the first power supply or the second power supply is stopped during the image formation.

3. An image forming apparatus comprising the power supply unit according to claim 1, wherein the image forming apparatus performs image formation using the electric power supplied from the power supply unit.

4. A power supply unit comprising:

a first power supply configured to supply electric power to a load using electric power supplied from an external power source;

a second power supply including an electric storage unit configured to store the electric power supplied from the external power source, the second power supply being configured to supply the electric power stored in the electric storage unit to the load;

a no-power detecting unit configured to monitor a voltage of the external power source and detect that no electric power is supplied from the external power source; and an output switching unit configured to switch the electric power to be supplied to the load to the electric power supplied from the second power supply when the no-power detecting unit detects that no electric power is supplied from the external power source, wherein a first setting value that is a target output voltage of the first power supply is larger than a second setting value that is a target output voltage of the second power supply, the second power supply performs switching between constant-current output operation and constant-voltage output operation, and the output switching unit switches the second power supply from the constant-current output operation to the constant-voltage output operation when the no-power detecting unit detects that no electric power is supplied from the external power source.

5. An image forming apparatus comprising the power supply unit according to claim 4, wherein the image forming apparatus performs image formation using the electric power supplied from the power supply unit.

6. A power supply unit comprising:

a first power supply configured to supply electric power to a load using electric power supplied from an external power source;

a second power supply including an electric storage unit configured to store the electric power supplied from the external power source, the second power supply being configured to supply the electric power stored in the electric storage unit to the load;

a no-power detecting unit configured to monitor a voltage of the external power source and detect that no electric power is supplied from the external power source; and an output switching unit configured to switch the electric power to be supplied to the load to the electric power supplied from the second power supply when the no-power detecting unit detects that no electric power is supplied from the external power source, wherein among two output voltage ranges into which a predetermined voltage range for the load is divided, one of the output voltage ranges that includes a first setting value is set as a guaranteed voltage range of the first power supply, and the other output voltage range that includes a second setting value is set as a guaranteed voltage range of the second power supply, and each of the first power supply and the second power supply includes a voltage detecting unit configured to detect an output voltage, and a control unit configured to operate such that the output voltage detected by the voltage detecting unit becomes a target output voltage and stop operating when the output voltage detected by the voltage detecting unit is out of the guaranteed voltage range.

\* \* \* \* \*